United States Patent
Vauchel et al.

(10) Patent No.: US 9,518,535 B2
(45) Date of Patent: Dec. 13, 2016

(54) ASSEMBLY INCLUDING A REVERSE THRUST DEVICE AND SYSTEM FOR ACTUATING SAID DEVICE

(71) Applicant: AIRCELLE, Gonfreville l'Orcher (FR)

(72) Inventors: Guy Bernard Vauchel, Harfleur (FR); Patrick Gonidec, Bretx (FR)

(73) Assignee: AIRCELLE, Gonfreville l'Orcher (FR)

( * ) Notice: Subject to any disclaimer, the term of this patent is extended or adjusted under 35 U.S.C. 154(b) by 535 days.

(21) Appl. No.: 13/691,160

(22) Filed: Nov. 30, 2012

(65) Prior Publication Data
US 2013/0263600 A1 Oct. 10, 2013

Related U.S. Application Data

(63) Continuation of application No. PCT/FR2011/051220, filed on May 27, 2011.

(30) Foreign Application Priority Data

Jun. 1, 2010 (FR) ..................... 10 54274

(51) Int. Cl.
*F02K 1/72* (2006.01)
*F02K 1/76* (2006.01)
*F02K 1/12* (2006.01)

(52) U.S. Cl.
CPC ............. *F02K 1/763* (2013.01); *F02K 1/1207* (2013.01); *F02K 1/72* (2013.01); *F02K 1/766* (2013.01)

(58) Field of Classification Search
CPC ............ F02K 1/763; F02K 1/766; F02K 1/72; F02K 1/1207

USPC ............ 60/226.2, 230, 232, 771; 244/110 B; 239/265.19, 265.35
See application file for complete search history.

(56) References Cited

U.S. PATENT DOCUMENTS

| 3,797,785 A | 3/1974 | Barresem et al. |
| 3,814,324 A | 6/1974 | Wanger |
| 3,988,889 A * | 11/1976 | Chamay et al. ............. 60/226.2 |
| 5,344,197 A * | 9/1994 | Rouzaud .......................... 292/5 |
| 6,318,070 B1* | 11/2001 | Rey et al. ....................... 60/771 |
| 2009/0188233 A1 | 7/2009 | Vauchel et al. |
| 2010/0115958 A1* | 5/2010 | Parham ......................... 60/771 |

(Continued)

FOREIGN PATENT DOCUMENTS

| FR | 2622929 | 2/1989 |
| FR | 2902839 | 12/2007 |
| FR | 2917788 | 12/2008 |

OTHER PUBLICATIONS

PCT/FR2011/051220 International Search Report.

*Primary Examiner* — Ted Kim
(74) *Attorney, Agent, or Firm* — Burris Law, PLLC

(57) ABSTRACT

A reverse thrust device and a system for actuating the reverse thrust device is provided by the present disclosure. The device includes at least one cowl that is translatably mounted in a direction substantially parallel to a longitudinal axis of a nacelle. The actuation system includes an actuation means that is capable of activating translational and rotational movement of the cowl and a panel of a nozzle. The actuation system also includes a downstream locking means for the nozzle and the cowl. The downstream locking means includes at least two reversible states, one of the states being a locked state in which the downstream locking means is suitable for locking the panel of the nozzle into a position for varying the section for outputting the nozzle with the cowl.

9 Claims, 3 Drawing Sheets

(56) References Cited

U.S. PATENT DOCUMENTS

2010/0126139 A1\* 5/2010 Howe ........................ 60/226.2
2010/0192715 A1\* 8/2010 Vauchel et al. ............. 74/89.35

\* cited by examiner

ASSEMBLY INCLUDING A REVERSE THRUST DEVICE AND SYSTEM FOR ACTUATING SAID DEVICE

CROSS-REFERENCE TO RELATED APPLICATIONS

This application is a continuation of International Application No. PCT/FR2011/051220 filed on May 27, 2011, which claims the benefit of FR 10/54274, filed on Jun. 1, 2010. The disclosures of the above applications are incorporated herein by reference.

FIELD

The present disclosure relates to a system for actuating a variable nozzle thrust reverse device of a turbojet engine nacelle and a nacelle comprising such an actuating system.

BACKGROUND

The statements in this section merely provide background information related to the present disclosure and may not constitute prior art.

A nacelle generally has a tubular structure comprising an air intake upstream of the turbojet engine, a middle section designed to surround a fan of the turbojet engine, and a downstream section housing thrust reverser means and designed to surround the combustion chamber of the turbojet engine, and generally ends with a jet nozzle whereof the outlet is situated downstream of the turbojet engine.

Modern nacelles are designed to house a dual flow turbojet engine capable of generating a flow of hot air (also called hot flow) via the rotating fan blades, coming from the combustion chamber of the turbojet engine, and a flow of cold air (secondary flow) that circulates outside the turbojet engine through an annular passage, also called a tunnel, formed between a fairing of the turbojet engine and an inner wall of the nacelle. The two flows of air are discharged from the turbojet engine through the rear of the nacelle.

The role of a thrust reverse device is, during landing of an airplane, to improve the braking capacity thereof by reorienting at least part of the thrust generated by the turbojet engine forward. In that phase, the reverser obstructs the cold flow, and orients that flow toward the front of the nacelle, thereby generating a counter-thrust that is added to the braking of the wheels of the airplane.

The means implemented to perform this reorientation of the cold flow vary depending on the type of reverser. However, in all cases, the structure of a reverser comprises moving elements that can be moved between a deployed position in which they open a passage in the nacelle designed for the diverted flow on the one hand, and a retracted position in which they close that passage on the other hand.

These moving elements may perform a cascade function, or simply serve to activate other cascade means.

In the case of a cascade vane thrust reverser, the flow of air is reoriented by cascade vanes, associated with reverser flaps, the cowl performing only a sliding function aiming to uncover or cover the cascade vanes.

The reverser flaps form blocking doors that may be activated by sliding the cowl, causing closing of the tunnel downstream of the grids, so as to optimize the reorientation of the flow of cold air.

Furthermore, aside from its thrust reversal function, the sliding cowl belongs to the rear section and has a downstream side forming the jet pipe nozzle aiming to channel the discharge of the flows of air.

This nozzle provides the necessary power for propulsion by imparting a speed to the exhaust stream and modulates the thrust by varying the outlet area thereof in response to variations of the adjustment of the power of the engine and flight conditions.

This jet nozzle comprises a series of moving panels rotatably mounted at a downstream end of the sliding cowl.

These panels are adapted to pivot toward a position causing the nozzle section to vary.

The actuating kinematics of the cowl and such a nozzle are complex.

In fact, the nozzle being mounted on the moving cowl, the moving panels must be associated with an actuating system making it possible to drive them simultaneously and synchronously with the moving cowl during thrust reversal when the cowl moves to uncover the cascade vanes on the one hand, and to drive them, when the cowl is in the retracted position, to adapt the optimal section of the jet nozzle as a function of the different flight phases, i.e. the takeoff, cruising, and landing phases of the airplane.

Several dedicated actuating systems for responding to the particular desired kinematics of a variable nozzle and a moving cowl are known.

However, they are not satisfactory.

In fact, nacelles with a translating smooth nozzle are known in which the system for actuating the nozzle and the thrust reverser structure comprises actuating means associated with locking means.

These locking means comprise upstream locking designed to lock the thrust reverser structure on the fixed structure of the nacelle during phases for varying the nozzle section and direct jet phases.

They also comprise downstream locking designed to lock the reverser structure and the nozzle on the one hand, so as to ensure locking of the two structures during direct jet phases, and to release the nozzle from the reverser structure on the other hand, so that it translates in the downstream direction of the nacelle to increase the outlet section of the nozzle.

In this type of actuating system, to perform the thrust reversal, it is necessary to move the nozzle, then in the open position, in the upstream direction, then to lock the nozzle and the reverser structure and unlock the upstream lock to release the reverser structure and allow it to move in the downstream direction mutually with the nozzle.

However, these locking/unlocking operations take considerable time due to the many maneuvers required.

Furthermore, it has been observed that acoustic performance is decreased.

SUMMARY

The present disclosure includes a system for actuating a thrust reverse device with reduced nozzle section variation, that is simplified and effective and simplifies the maneuvers needed to actuate the nozzle and the reverser structure.

The actuating system according to the present disclosure decreases the loss of acoustic performance of said thrust reverse device.

The actuating system according to the present disclosure does not include any closing of the nozzle to perform thrust reversal.

The actuating system according to the present disclosure also functions such that the movements of the actuators during the phases for maneuvering the variable nozzle and the reverser structure are controlled.

The present disclosure includes a system for actuating a reverse thrust device, said device including at least one cowl that is translatably mounted in a direction substantially parallel to a longitudinal axis of a nacelle capable of passing alternately between a closed position, in which it ensures the aerodynamic continuity of the nacelle, and an open position, in which it opens a passage into the nacelle intended for a diverted flow, said moving cowl also being extended by at least one variable nozzle section, said nozzle including at least one rotatably mounted panel, said panel being suitable for pivoting towards at least one position causing a variation in the nozzle section, the system including an actuation means that is capable of activating the respective translational and rotational movement of the cowl and the panel of the nozzle, remarkable in that it also includes a downstream locking means for the nozzle and the cowl, the downstream locking means including at least two reversible states, one of said states being a locked state in which the downstream locking means is suitable for locking the panel of the nozzle into a position for varying the section for outputting the nozzle with the cowl.

According to certain forms of the present disclosure, the actuating system may comprise one or more of the following features, considered alone or according to all technically possible combinations:

- the downstream locking means are in an unlocked state in direct jet and during phases for varying the nozzle section and, conversely, in a locked state in reverse jet to allow the nozzle to move with the cowl in the downstream direction of the nacelle;
- the system also comprises upstream locking means comprising at least two reversible states, one of said states being a locked state in which the upstream locking means are adapted to keep the cowl in the closed position secured to a fixed structure of the nacelle;
- the upstream locking means are in a locked state in direct jet and during nozzle section varying phases and, conversely, in an unlocked state in direct jet allowing the cowl to move in the downstream direction of the nacelle;
- the actuating means can activate the translation of the cowl and pivoting of the panel of the nozzle toward a position causing the section of the nozzle to vary independently of the movement of the cowl;
- the actuating means comprise a linear actuator comprising a base inside which a rod is housed designed to be fastened to the upstream end of the panel of the nozzle;
- the downstream locking means are partially mounted on the actuating means;
- a gripping means is mounted on the rod of the actuator and a hook is mounted across from it on the cowl;
- the downstream locking means are partially mounted on the panel of the nozzle;
- a gripping means is mounted on an upstream end of the panel and a hook is mounted across from it on the cowl;
- the system also comprises control means capable of driving the upstream and downstream actuating means and locking means;
- the control means comprise an electric system mounted on a fixed structure of the nacelle driving a rotary return system toward the downstream locking means.

The present disclosure also proposes a dual flow turbojet engine comprising a thrust reverse device equipped with an actuating system as described above.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 5:
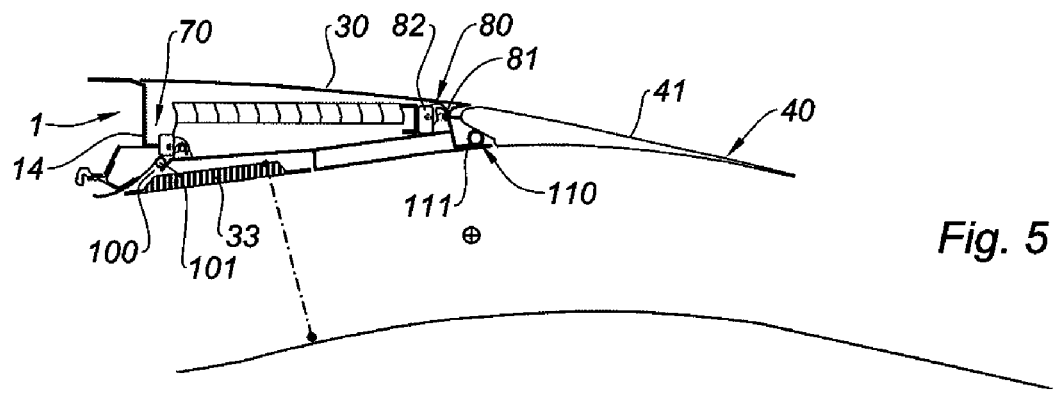
Figure 6:
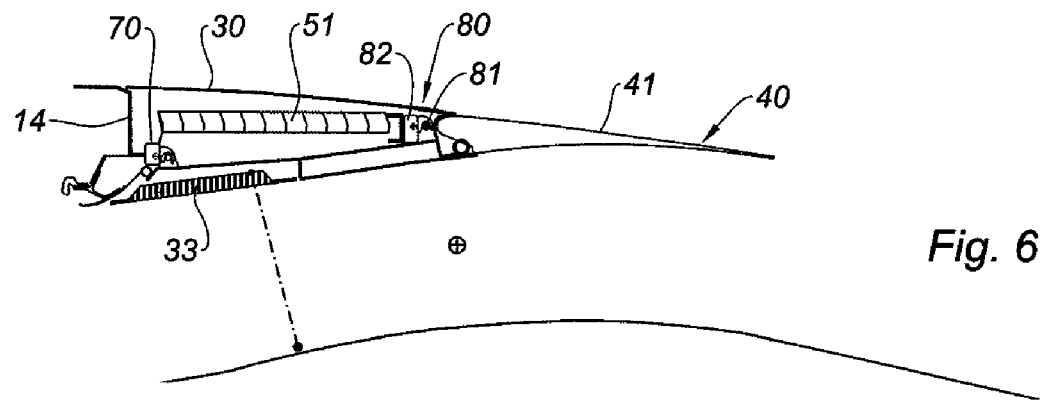
Figure 7:
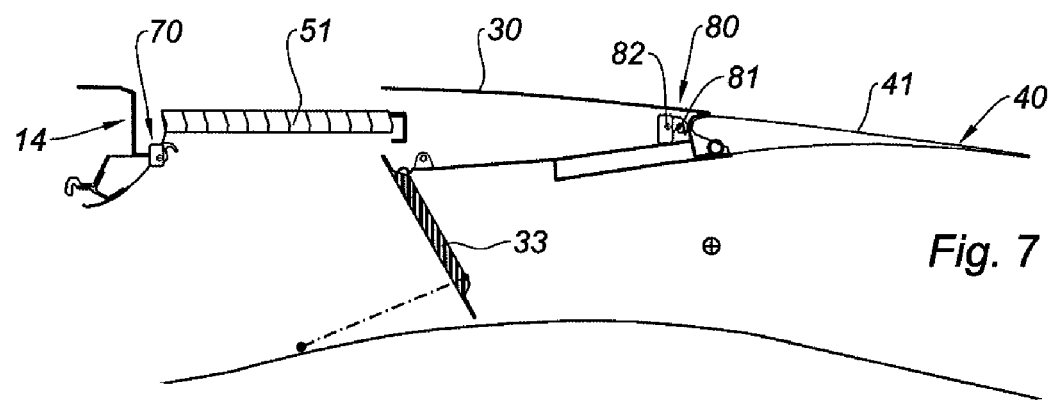
Figure 8:
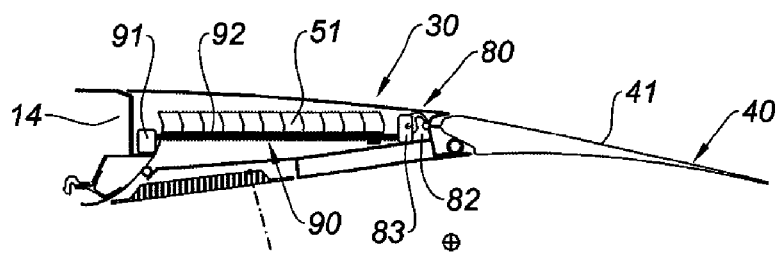
Figure 9:
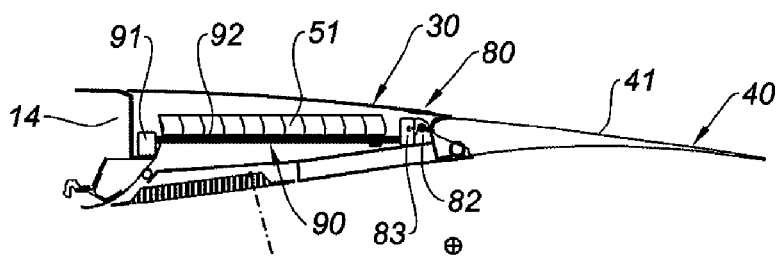
Figure 10:
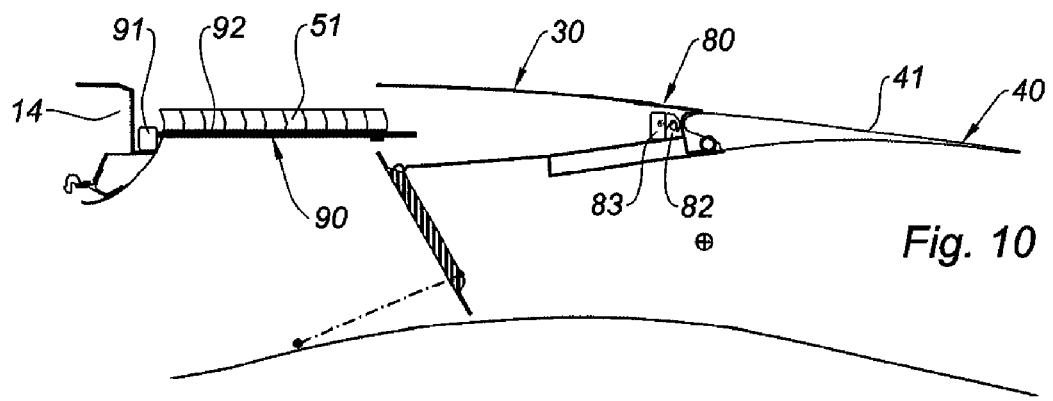

FIGS. 5 to 7 are diagrammatic longitudinal cross-sectional illustrations of a thrust reverse device according to a second embodiment of the present invention in a cruising position, in an increased nozzle section position, and in a reverse jet position; and FIGS. 8 to 10 are diagrammatic longitudinal cross-sectional illustrations of the thrust reverse device according to FIGS. 5 to 7, respectively, in which a system is shown for driving the downstream locking means of the device, in a cruising position, in an increased nozzle section position, and in a reverse jet position.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In general, a nacelle is designed to form a tubular housing for a dual flow turbojet engine and serves to channel the flows of air generated by fan blades, i.e. a flow of hot air passing through a combustion chamber and a flow of cold air circulating outside the turbojet engine.

This nacelle comprises an upstream section forming an air intake, a middle section surrounding the fan of the turbojet engine, and a downstream section surrounding the turbojet engine.

Figure 1:
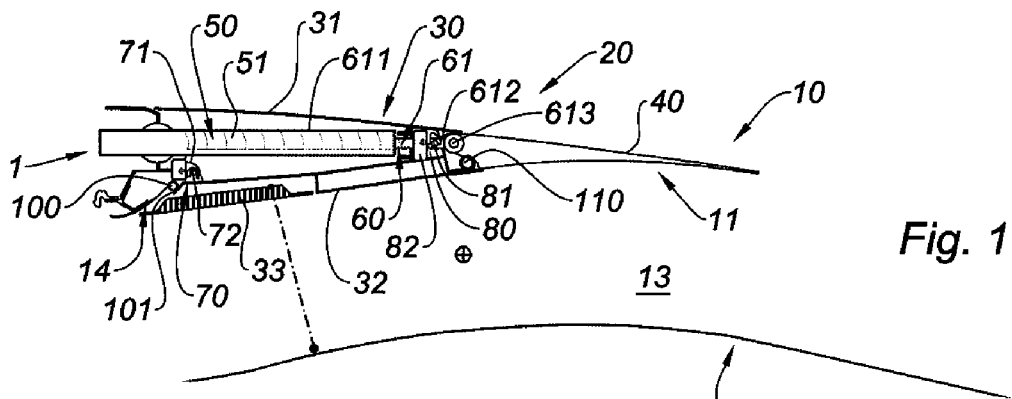
FIG. 1 is a diagrammatic longitudinal cross-sectional illustration of a thrust reverse device according to a first embodiment of the present invention and in an increased nozzle section position.

FIG. 1 shows part of the middle section and the downstream section, respectively designated by general references 1 and 10.

This downstream section 10 comprises an outer structure 11 including a thrust reverse device 20 and an inner engine fairing structure 12 defining, with the outer structure 11, a tunnel 13 designed for the circulation of a cold flow in the case of the dual flow turbojet engine as presented here.

The downstream section 10 also comprises a front frame 14, a moving frame 30 comprising an outer shroud 31 and an inner shroud 32, and a jet nozzle section 40.

The cowl 30 is designed to be actuated in a substantially longitudinal direction of the nacelle between a closed position, in which the inner shroud 32 comes into contact with the front frame 14 and the outer shroud 31 comes into contact with the middle section 1 and ensures the aerodynamic continuity of the outer lines of the downstream section 10, and an open position in which it opens a passage in the nacelle and uncovers cascade means 50.

This cowl 30 allows the secondary flow of the turbojet engine to at least partially escape, this flow portion being reoriented toward the front of the nacelle by cascade vanes 51, thereby generating a counter-thrust able to assist with the braking of the aircraft.

The moving cowl 30 is moved by a rail/slide system (not shown in the figure) known by those skilled in the art.

In order to increase the secondary flow portion passing through the grids 51, the inner shroud 32 of the cowl 30 comprises a plurality of reverser flaps 33, distributed on its circumference and each mounted pivoting by one end around a hinge pin, on the cowl 30 sliding between a retracted position in which the flap 33 closes the opening and ensures the inner aerodynamic continuity of the tunnel 13, and a deployed position in which, in a reversed thrust situation, it at least partially obstructs the tunnel 13 so as to deflect the cold flow toward the grids 51.

Furthermore, the jet nozzle section 40 in the downstream extension of the moving cowl 30 comprises a series of moving panels 41 rotatably mounted at a downstream end of the moving cowl 30 and distributed on the periphery of the jet nozzle section 40.

Each panel 41 is adapted to pivot toward at least one position causing the section of the nozzle 40 to vary and, more specifically, a position increasing the nozzle section.

In one alternative form, each panel 41 is also adapted to pivot toward at least one position causing the section of the nozzle 40 to decrease as well.

Each panel 41 is supported by the moving cowl 30 by means of pivot points along an axis perpendicular to the longitudinal axis of the nacelle with the inner shroud 32 of the moving cowl 30 and with said moving panel 41.

Furthermore, actuating means 60 can activate the translation of the cowl 30 and pivoting of the panel 41 of the nozzle 40 to a position causing the section of the nozzle 40 to vary independently of the movement of the moving cowl 30.

These actuating means 60 comprise at least one simple electric-, hydraulic- or pneumatic-action linear actuator 61.

This actuator 61 may be placed between two tie lines of the cascade vanes 51.

The actuator 61 may allow the cowl 30 to move upstream or downstream of the nacelle and ensure pivoting of the panels 41 of the nozzle 40 during phases for varying the nozzle section 40.

It thus advantageously performs two functions, i.e. managing the output section of the nozzle 40 and managing the thrust reversal in cooperation with locking means described later.

More specifically, the actuator 61 comprises a cylindrical base 611 inside which a rod 612 is housed.

The base 611 is designed to be attached, at its upstream and, to the front frame 14, while the rod 612 is connected, at its downstream end, to the upstream end of the panel 41 directly by a fastening eyelet 613 capable of allowing a panel 41 of the nozzle 40 to pivot.

In one alternative form, the rod 612 is connected, at its downstream end, to the upstream end of the panel 41 indirectly by means of driving means of the driving link rod type downstream of their structure, articulated on a transverse driving axis provided on its structure.

Furthermore, as illustrated in FIG. 1, the actuating system comprises a double locking system.

This system comprises upstream locking means 70 comprising at least two reversible states, on the one hand, one of said states being a locked state in which the upstream locking means 70 are adapted to keep the cowl 30 in the closed position, secured to the fixed structure of the nacelle.

On the other hand, it comprises downstream locking means 80 comprising at least two reversible states, one of said states being a locked state in which the nozzle 40 is locked with the cowl 30.

Said upstream 70 and downstream 80 locking means are made up of cooperating elements respectively secured to each part to be secured and are of known and commonly used types such as claw or pawl locks, the component elements of which will not be described in more detail hereafter.

Regarding the upstream locking means 70, a hook 71 is mounted on the fixed structure, advantageously on the front frame 14, and the complementary element, i.e. a gripping means 72, on the upstream end of the cowl 30 opposite it to cooperate.

Figure 4:
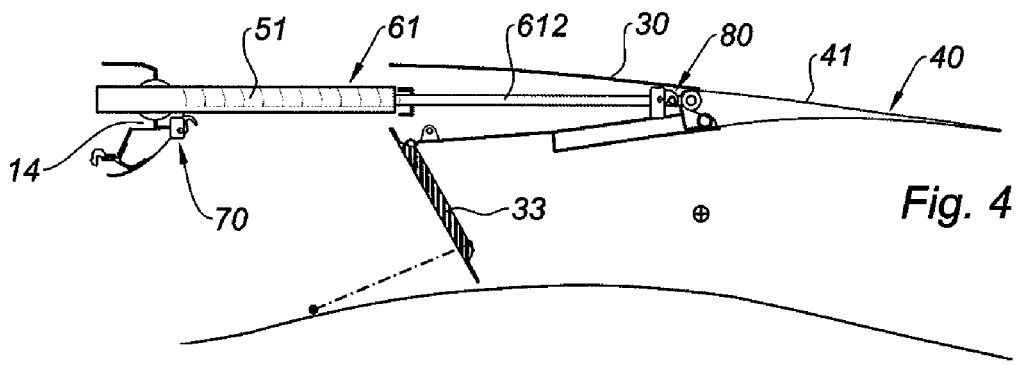
FIG. 4 is an illustration of the thrust reverse device of FIG. 1 in a thrust reversal position.

These upstream locking means 70 are, as illustrated in FIG. 1, in a locked state during direct jet phases, i.e., in particular in the cruising phase, and during phases for varying the section of the nozzle 40, and, conversely, as illustrated in FIG. 4, in an unlocked state during thrust reversal phases allowing the cowl 30 to move in the downstream direction of the nacelle.

It also keeps the fixed structure 14 and the cowl 30 integral during opening of the nozzle 40 and in the direct jet phases of the aircraft.

In one alternative form, these upstream locking means 70 can also ensure the locking function of the reverser flaps 33 during the cruising phase.

The downstream locking means 80 are adapted only to use one single-acting actuator 61 instead of double action cylinders or dual cylinders to move the cowl 30 and the nozzle 40 and, on the other hand, to directly ensure the passage from a position varying the section of the nozzle 40 to a thrust reversal position.

Figure 2:
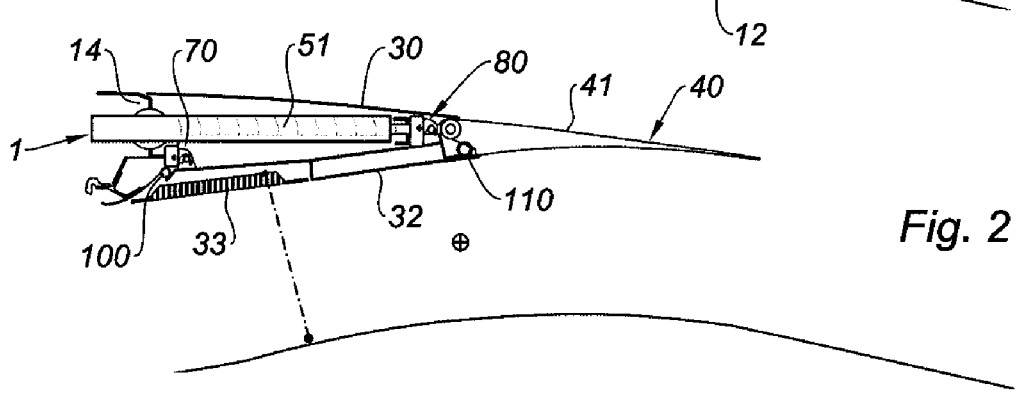
FIGS. 2 and 3 are views of the thrust reverse device of FIG. 1 in which the upstream locking means between a cowl and a fixed nacelle structure are respectively in the locked state and the unlocked state.

They thus comprise an unlocked state in which they are adapted to allow the nozzle 40 to be locked in the position varying the section of the nozzle 40 with the moving cowl, and, more specifically, in the increased nozzle 40 section position as illustrated in FIG. 2, so as to go from a position for varying the section of the nozzle 40 to a thrust reversal position of the cowl 30.

These downstream locking means 80 are, as illustrated in FIGS. 1 to 4, in an unlocked state during direct jet phases, i.e. in particular in the cruising phase and during phases for varying the section of the nozzle 40 and, conversely, as illustrated in FIG. 4, in a locked state during thrust reversal phases allowing the nozzle 40 to move with the cowl 30 in the downstream direction of the nacelle.

In a first form illustrated in FIGS. 5 to 7, the downstream locking means 80 are mounted relative to the structure of the panel 41 of the nozzle 40, at the downstream end of the grids 51 or the rear frame of the grids, if one exists.

They are thus subject to the position of the panel 41 of the nacelle 40.

More specifically, they comprise a gripping means 81 mounted on the upstream end of the panel 41 across from a hook element 82 mounted on the inner shroud 32 of the cowl 30 when the panel 41 is in an open nozzle 40 section position.

These complementary elements 81 and 82 are adapted to cooperate, i.e. to lock when the nozzle 40 is in a phase for varying the section of the nozzle 40, as illustrated in FIGS. 5 and 6.

In a second form illustrated in FIGS. 1 to 4, the downstream locking means 80 are mounted on the structure of the actuator 60.

They are thus subject to the deployment of the actuator and, more specifically, to the position of the rod 612 of the actuator 61.

Figure 3:
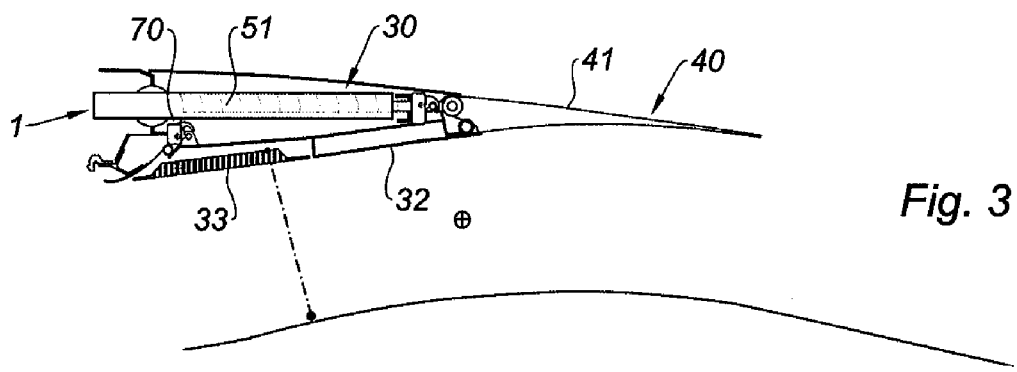

The rod 612 comprises, at least on one side, a protruding gripping means 81 mounted across from a hook element 82 mounted on the inner shroud 32 of the cowl 30 so as to cooperate and unlock when the panel 41 of the nozzle 40 is in the open nozzle section position, as illustrated in FIGS. 2 and 3.

The hook element 82 may be on a single side of the rod 612, or maybe transverse to the rod 612.

If the panels 41 are driven using an indirect driving system, such as a cylinder dedicated to actuating at least two panels 41, the downstream locking means 80 may be mounted either as previously defined, or on an intermediate member for driving the panels 41, such as driving link rods for example, or on the very structure of one of the panels 41.

In another form of the present disclosure, locking means (not shown) adapted to ensure locking of the panels 41 of the nozzle 40 in the cruising phase of the aircraft may be proposed.

Advantageously, with such an invention, it is possible to produce the thrust reversal and manage the variation of the section of the nozzle 40 with a single-acting actuator 60 while keeping a nozzle 40 in the open section position before going to the thrust reversal phase. This thus eliminates any closing of the nozzle 40 in the nominal position before thrust reversal.

This offers the advantage of not deteriorating the acoustic performance of the device 20 and optimizes the time necessary to establish the thrust reversal.

Such a device 20 also offers an actuating system with a simple and reliable single-action actuator 61 relative to a dual-action actuating system or even a double actuating system, which makes it possible to control the mass of the entire device 20.

Furthermore, by providing a single-acting actuator, the moving cowl 30 and the moving panels 41 are actuated with kinematics specific to them during adjustment of the variation of the section of the nozzle 40, which offers the advantage of being able to limit movements of the moving cowl 30 to very small movements, or even no movements, during the pivot phases of the moving panel 41 in a position making it possible to increase or reduce the section of the jet nozzle 40.

Furthermore, the actuating system also comprises a control unit capable of driving the upstream and downstream locking means 70, 80 and the actuator 61 according to a predetermined actuating sequence managing all of the locking/unlocking and actuating operations.

It is adapted to activate the pivoting of the panels of the nozzle 40 and the movement of the cowl 30 independently.

An alternative form may provide independent control units for the upstream locking means 70, the downstream locking means 80, and the actuator 61.

In a first alternative form, the downstream locking means 80 are associated with electric control means, of the direct power by direct circuit type (wire or mechanical contact) or the alternating power by disconnectable system type.

In a second alternative form, the downstream locking means 80 are associated with mechanical control means 90.

In reference to FIGS. 8 to 10, the actuating system comprises an electrical system 91 mounted on the front frame 14 driving a rotary return system 92 toward a locking block 83 of the hook 82 of the downstream locking means 80 situated downstream of the cowl 30.

The rotary return system 92 may be supported at the downstream portion thereof by the grid structure 51 or by the rear frame of the grids 51.

In the direct jet and nozzle 40 section variation phase illustrated in FIGS. 8 and 9, the return system 92 interfaces with the locking block 83, which may be driven mechanically.

In the thrust reversal phase illustrated in FIG. 10, the return system 92 is disconnected from the locking block 83, preventing it from being driven.

In both disconnection cases, reliability of the prohibition against unlocking during thrust reversal maneuvering of the panels of the nozzle 40 in the cowl 30 is ensured.

The operation of the thrust reverse device 20 is as follows during the direct jet, nozzle section variation, and thrust reversal phases for the two different embodiments of the downstream locking means 80.

In the direct jet phase and, more specifically, the cruising phase of the aircraft illustrated in FIG. 5, the reverser flaps 33 are in the retracted position and the cowl 30 is in the closed position, ensuring aerodynamic continuity with the middle section 1.

The upstream locking means 70 are in a locked state locking the cowl 30 on the fixed structure 14 of the nacelle.

The downstream locking means 80 are in an unlocked state between the cowl 30 and the nozzle 40, while the actuator 61 is in a position such that the cruising phase of the aircraft is ensured.

During the phase for varying the section of the nozzle 40 and, more specifically, increasing the section of the nozzle 40 illustrated in FIGS. 1 and 6, the cowl 30 is in the closed position covering the cascade vanes 51 and the reverser flaps 33 are in the retracted position.

The cowl 30 not having been moved, the upstream locking means 70 are in a locked state.

The actuator 61 and, more specifically, the rod 612 of the actuator 61 has been actuated and retracted in the upstream direction of the nacelle, then causing the moving panel 41 of the nozzle 40 to pivot from its pivot point 42 toward the outside of the tunnel 13, thereby increasing the section of the nozzle 40.

At that stage, the downstream locking means 80 are consequently in an unlocked state.

The adjustment of the section according to the significance of the discharged flow thus makes it possible to optimize the output and improve the performance, such as specific consumption.

When a thrust reversal command is emitted, as illustrated in FIGS. 2 and 6, owing to the downstream locking means 80, the nozzle 40 is locked in position increasing the section of the nozzle 40 with the cowl 30 so as to form an integral downstream structure.

As illustrated in FIG. 3, the upstream locking means 70 goes into an unlocked state releasing the cowl 30 from the fixed structure 14.

In reference to FIGS. 4 and 7, the cowl 30 being released and secured to the nozzle 40, the rod 612 of the actuator 61 is then translated, said rod communicating its movement to the nozzle 40 secured to the cowl 30, so as to move the cowl 30 in the downstream direction.

This translation of the cowl 30 in the downstream direction of the nacelle by a length substantially equal to the length of the cascade vanes 51 causes the reverser flaps 33 to pivot around their pivot point inside the tunnel 13 so that they fully play their thrust reversal role, obstructing the tunnel 13 to force the air to be oriented through the cascade vanes 51.

In reference in particular to FIGS. 1 and 5, the thrust reverse device 20 also comprises upstream sealing means 100 between the cold flow tunnel 13 and the outside of the nacelle arranged under the cascade vanes 51.

These upstream sealing means 100 are preferably supported by the cowl 30.

They comprise a sealing ring 101 preferably supported by the inner shroud 32 of the cowl 30 in contact with the front frame 14.

This makes it possible to ensure sealed contact between the fixed structure of the device 20 and the moving cowl 30 in the direct jet phases.

Furthermore, the thrust reverse device 20 comprises downstream sealing means 110 between the cold flow tunnel 13 and the outside of the nacelle arranged between the cowl 30 and the upstream end of the panels 41 of the nozzle 40.

These downstream sealing means 110 comprise a sealing ring 111 supported by the downstream end of the inner shroud 32 of the moving cowl 30 in contact with a diversion on the inner surface of the panel 41 so as to ensure sealing relative to the interface between the cowl 30 and panels 41.

In one alternative form, the downstream sealing means 110 may be supported by the moving panel 41 itself.

Of course, the invention is not limited solely to the embodiments of the actuating system described above as examples, but on the contrary encompasses all possible alternatives.

What is claimed is:

1. An assembly comprising:
  a reverse thrust device; and
  a system for actuating said reverse thrust device,
  said thrust reverse device including at least one cowl that is translatably mounted in a direction parallel to a longitudinal axis of a nacelle capable of passing alternately between a closed position, in which the cowl provides aerodynamic continuity of the nacelle, and an open position, in which the cowl opens a passage into the nacelle intended for a diverted flow, said moving cowl also being extended by at least one variable nozzle section, said nozzle including at least one rotatably mounted panel, said panel being suitable for pivoting towards at least one position causing a variation in the nozzle section, the system including an actuation means consisting of a single actuator that is capable of activating the respective translational and rotational movement of the cowl and the panel of the nozzle, wherein the system further includes:
  a downstream locking device for the nozzle and the cowl, the downstream locking device being activated by the single actuator and including at least two reversible states, one of said states being a locked state in which the downstream locking device locks the panel of the nozzle into a position for varying the section of the nozzle and locks the nozzle with the cowl such that the nozzle moves with the cowl.

2. The assembly according to claim 1, characterized in that the downstream locking device is in an unlocked state in direct jet and during phases for varying the nozzle section and, conversely, in a locked state in reverse jet to allow the nozzle to move with the cowl in the downstream direction of the nacelle.

3. The assembly according to claim 1, further comprising an upstream locking device comprising at least two reversible states, one of said states being a locked state in which the upstream locking device is adapted to keep the cowl in the closed position secured to a fixed structure of the nacelle.

4. The assembly according to claim 3, characterized in that the upstream locking device is in a locked state in direct jet and during nozzle section varying phases and, conversely, in an unlocked state in direct jet allowing the cowl to move in the downstream direction of the nacelle.

5. The assembly according to claim 1, characterized in that the single actuator can activate the translation of the cowl and pivoting of the panel of the nozzle toward a position causing the section of the nozzle to vary independently of the movement of the moving cowl.

6. The assembly according to claim 5, characterized in that the single actuator is a linear actuator comprising a base inside which a rod is housed designed to be fastened to the upstream end of the panel of the nozzle.

7. The assembly according to claim 1, characterized in that the downstream locking device is partially mounted on the single actuator.

8. The assembly according to claim 6, further comprising a gripping means is mounted on the rod of the actuator and a hook is mounted across from it on the cowl.

9. A dual flow turbojet engine comprising a thrust reverse device fequipped with an actuating system according to claim 1.

* * * * *